US008175756B2

(12) United States Patent
Musti et al.

(10) Patent No.: US 8,175,756 B2
(45) Date of Patent: May 8, 2012

(54) SYSTEM AND METHOD TO MANAGE POWER CONSUMPTION

(75) Inventors: Subrahmanyam S. Musti, Tampa, FL (US); Sri Ramanathan, Lutz, FL (US); Matthew A. Terry, Dunwoody, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 12/389,543

(22) Filed: Feb. 20, 2009

(65) Prior Publication Data

US 2010/0217449 A1 Aug. 26, 2010

(51) Int. Cl.
*G06F 19/00* (2011.01)

(52) U.S. Cl. ............................ 700/295; 700/22; 700/297

(58) Field of Classification Search .................... 700/22, 700/295, 297
See application file for complete search history.

(56) References Cited

U.S. PATENT DOCUMENTS

| 6,476,708 | B1 | 11/2002 | Johnson |
| 6,816,063 | B2 | 11/2004 | Kubler et al. |
| 6,909,891 | B2 | 6/2005 | Yamashita et al. |
| 6,982,656 | B1 * | 1/2006 | Coppinger et al. ........... 340/988 |
| 7,102,493 | B1 * | 9/2006 | Coppinger et al. ...... 340/426.19 |
| 7,136,709 | B2 * | 11/2006 | Arling et al. ..................... 700/65 |
| 7,319,412 | B1 * | 1/2008 | Coppinger et al. ........... 340/988 |
| 7,668,532 | B2 | 2/2010 | Shamoon et al. |
| 7,715,951 | B2 * | 5/2010 | Forbes et al. .................. 700/291 |
| 2002/0072356 | A1 | 6/2002 | Yamashita et al. |
| 2004/0051393 | A1 | 3/2004 | Ratcliffe |
| 2005/0049760 | A1 | 3/2005 | Narayanaswami et al. |
| 2006/0111089 | A1 * | 5/2006 | Winter et al. ............... 455/414.1 |
| 2006/0111955 | A1 * | 5/2006 | Winter et al. ...................... 705/8 |
| 2006/0232437 | A1 | 10/2006 | Gutowski et al. |
| 2007/0032225 | A1 * | 2/2007 | Konicek et al. ............... 455/417 |
| 2007/0115902 | A1 | 5/2007 | Shamoon et al. |
| 2008/0012722 | A1 | 1/2008 | Moseley |
| 2009/0248854 | A1 * | 10/2009 | Conway ........................ 709/224 |

FOREIGN PATENT DOCUMENTS

| KR | 2009 0016906 A | 2/2009 |
| WO | 01/46926 A1 | 6/2001 |
| WO | 2004/034352 A1 | 4/2004 |
| WO | 2007/054584 A1 | 5/2007 |

OTHER PUBLICATIONS

Communication Relating to the Results of the Partial international Search, PCT/EP2010/051999, dated Aug. 26, 2010.
Office Action dated Jun. 7, 2011 in U.S. Appl. No. 12/389,554.
Final Office Action dated Sep. 26, 2011 in U.S. Appl. No. 12/389,554.

* cited by examiner

*Primary Examiner* — Michael D Masinick
(74) *Attorney, Agent, or Firm* — Anna Linne; Roberts Mlotkowski Safran & Cole, P.C.

(57) ABSTRACT

A method implemented in a computer infrastructure having computer executable code having programming instructions tangibly embodied on a computer readable storage medium. The programming instructions are operable to detect an occurrence of at least one of a geoboundary event, a radio frequency identification (RFID) event; and a local area network (LAN) event. Additionally, the programming instructions are operable to adjust one or more power consumption settings of an environment based on the occurrence.

28 Claims, 6 Drawing Sheets

SYSTEM AND METHOD TO MANAGE POWER CONSUMPTION

CROSS REFERENCE TO RELATED APPLICATION

This application is related to U.S. Ser. No. 12/389,554 filed on the same day, the contents of which are incorporated by reference herein in their entirety.

FIELD OF THE INVENTION

The present invention generally relates to managing power consumption, and more particularly, to a method and system to manage power consumption using radio frequency identification (RFID) sensors, network location geoboundaries and internet protocol (IP) multimedia subsystem based presence documents.

BACKGROUND

Energy conservation is the practice of decreasing the quantity of energy used. Energy conservation may be achieved through efficient energy use, in which case energy use is decreased while achieving a similar outcome and/or by reduced consumption of energy services. Energy conservation may result in, for example, increase of financial capital, environmental value, national security, personal security, and human comfort. Individuals and organizations that are direct consumers of energy may want to conserve energy in order to reduce energy costs and promote economic security. Industrial and commercial users may want to increase efficiency and thus maximize profit.

Energy conservation is an important element of energy policy. Energy conservation reduces the energy consumption and energy demand per capita, and thus offsets the growth in energy supply needed to keep up with population growth. This reduces the rise in energy costs, and can reduce the need for new power plants and energy imports. The reduced energy demand can provide more flexibility in choosing the most preferred methods of energy production.

Additionally, by reducing emissions, energy conservation is an important part of lessening climate change. Energy conservation facilitates the replacement of non-renewable resources with renewable energy. Energy conservation is often the most economical solution to energy shortages, and is a more environmentally benign alternative to increased energy production.

In view of the above, people are looking for ways to reduce power consumption towards saving energy and reducing carbon footprints globally. For example, architects and civil engineers are looking for ways to design new energy efficient homes and offices, and individuals are looking for ways and mechanisms to reduce their personal power consumption.

However, there still exist many instances of wasted power consumption. For example, most device chargers (such as, for example, a cellular phone charger) continue to draw power when they are not charging a device. That is, even when a device is not connected to its charger, if the charger is plugged into a power outlet, the charger will continue to draw (and waste) power. Collectively, this wasted power costs billions of dollars globally. Moreover, with the increasing awareness and desire to operate in a green manner, such excessive use of energy is undesirable.

Accordingly, there exists a need in the art to overcome the deficiencies and limitations described hereinabove.

SUMMARY

In a first aspect of the invention, a method is implemented in a computer infrastructure having computer executable code tangibly embodied on a computer readable storage medium having programming instructions. The programming instructions are operable to detect an occurrence of at least one of a geoboundary event, a radio frequency identification (RFID) event; and a local area network (LAN) event. Additionally, the programming instructions are operable to adjust one or more power consumption settings of an environment based on the occurrence.

In another aspect of the invention, a system comprises an IP multimedia subsystem (IMS) operable to detect an occurrence a geoboundary event and send an indication of the occurrence the geoboundary event using session internet protocol (SIP). Additionally, the system comprises a control unit operable to receive the indication of the geoboundary event and determine an occurrence of at least one of a radio frequency identification (RFID) event and a local area network (LAN) event. Furthermore, the control unit is operable to adjust one or more power consumption settings of an environment based on at least one of the indication of the geoboundary event and the determining the occurrence of the at least one of the RFID event and the LAN event.

In an additional aspect of the invention, a computer program product comprising a computer usable storage medium having readable program code embodied in the medium is provided. The computer program product includes at least one component operable to detect an occurrence of at least one of a geoboundary event, a radio frequency identification (RFID) event and a local area network (LAN) event. Additionally, the at least one component is operable to adjust one or more power consumption settings of an environment based on the occurrence. The detecting the occurrence of the geoboundary event comprises receiving location information of a device from a wireless carrier network and determining that the location information indicates a traversal of the device across an established geoboundary. An indication of the occurrence of the geoboundary event is transmitted via session internet protocol (SIP).

In a further aspect of the invention, a method comprises providing a computer infrastructure operable to detect an occurrence of at least one of a geoboundary event in response to a determination that a wireless device in a wireless carrier network has traversed an established geoboundary, a radio frequency identification (RFID) event and a local area network (LAN) event. Additionally, the computer infrastructure is operable to indicate the occurrence, wherein the occurrence of the geoboundary event is indicated using session initiation protocol (SIP) and receive one or more power consumption rules for at least one power consuming device. Furthermore, the computer infrastructure is operable to adjust one or more power consumption settings of an environment based on the indication of the occurrence. The adjusting the one or more power consumption settings of the environment is performed in accordance with the one or more power consumption rules for the at least one power consuming device. Additionally, the adjusting the one or more power consumption settings of the environment comprises controlling power distribution in the environment by at least one of accessing an environment power grid to adjust power supply in the environment, accessing the environment power grid to effect power line wiring signaling and/or control and accessing an environment internet protocol (IP) network to effect Power-over-Ethernet signaling and/or control. An indication of the occurrence of the geoboundary event is transmitted using session initiation protocol (SIP).

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
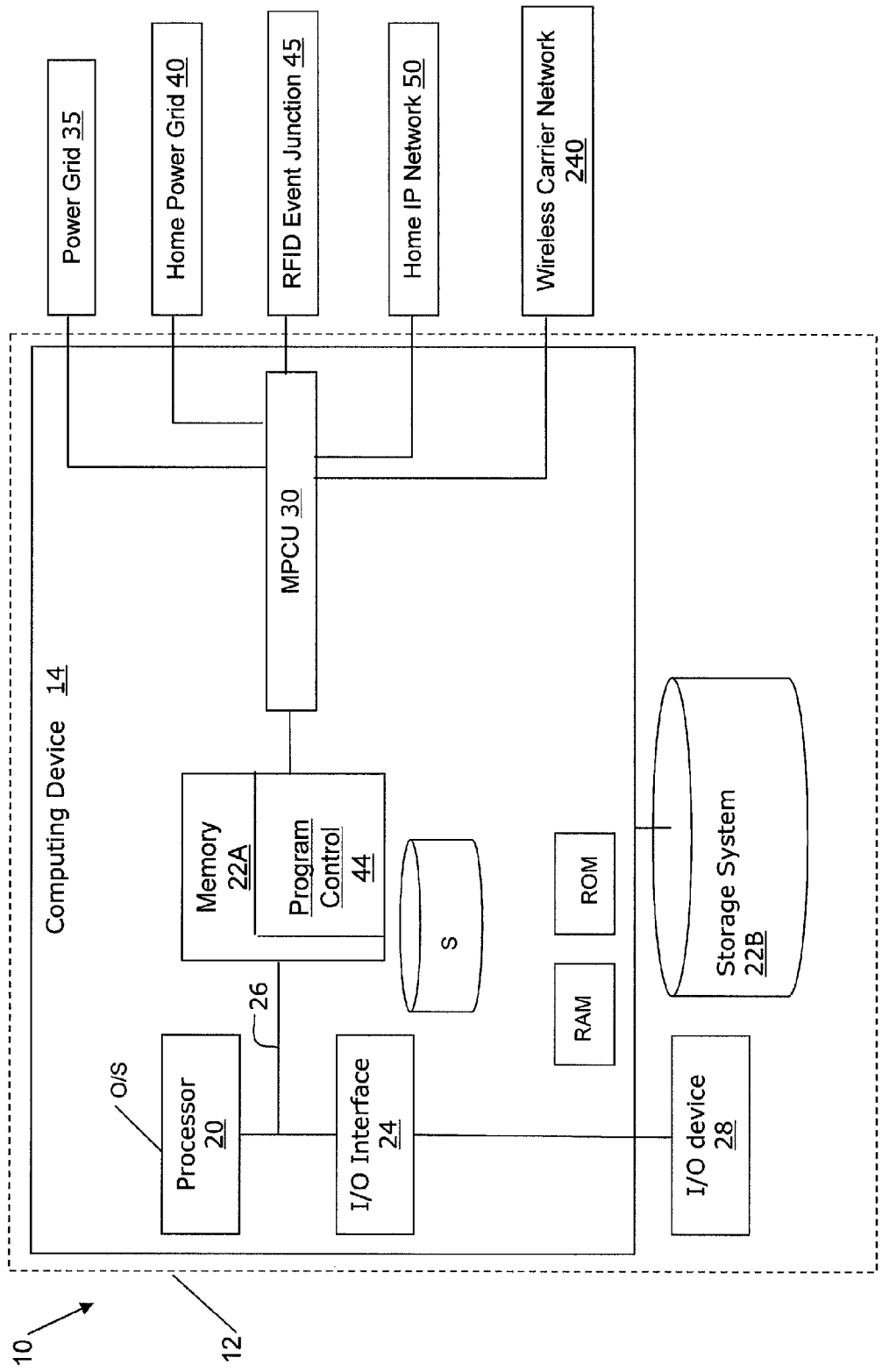
FIG. 1 shows an illustrative environment for implementing the steps in accordance with aspects of the invention.

The present invention generally relates to managing power consumption, and more particularly, to a method and system to manage power consumption using radio frequency identification (RFID) sensors, network location geoboundaries and internet protocol (IP) multimedia subsystem based presence documents. The present invention provides a system and method for automatically controlling power consumption using RFID and presence features provided by an IMS (IP (Internet Protocol) Multimedia Subsystem) network. More specifically, the present invention provides an IMS based revenue generating service that uses a RFID SIP gateway called a Modular Power Control Unit (MPCU) to receive RFID based information and combine it with knowledge of location and presence provided by the wireless network to control and manage power consumption in a home and/or office environment.

Radio Frequency Identification

Radio-frequency identification (RFID) is an automatic identification method, relying on storing and remotely retrieving data using devices called RFID sensors, tags or transponders. RFID technology utilizes some extent of cooperation between an RFID reader and an RFID tag. An RFID tag is an object that can be, for example, applied to or incorporated into, e.g., a product, animal, or person for the purpose of identification and tracking using radio waves. Some RFID tags, for example, may be read from several meters away and beyond the line of sight of the reader. Most RFID tags contain at least two components. One component is an integrated circuit for storing and processing information, modulating and demodulating a radio-frequency (RF) signal, and other specialized functions. The second component is an antenna for receiving and transmitting the signal.

RFID tags are being placed globally in a variety of consumer devices, including, for example, clothing, electronic devices, and electrical appliances, etc. While most of these tags are passive tags (costing just pennies per tag), there are a number of relatively higher value devices that will have active tags associated with them.

Passive RFID tags have no internal power supply. The minute electrical current induced in the antenna by the incoming radio frequency signal provides just enough power for the complementary metal-oxide semiconductor (CMOS) integrated circuit in the RFID tag to power up and transmit a response. The response of a passive RFID tag is not necessarily just an ID number. For example, the RFID tag chip can contain non-volatile data, (e.g., stored on a writable EEPROM). Passive RFID tags have practical read distances ranging from about eleven cm (four inches) with near-field, up to approximately ten meters (thirty-three feet) with far-field and can reach up to one-hundred-eighty-three meters (six-hundred feet).

Unlike passive RFID tags, active RFID tags have their own internal power source, which is used to power the integrated circuits and to broadcast the response signal to the reader. Communications from active RFID tags to readers is typically much more reliable (e.g., fewer errors) than those from passive RFID tags due to the ability for active RFID tags to conduct a "session" with a reader.

Additionally, active RFID tags, due to their onboard power supply, may transmit at higher power levels than passive RFID tags, allowing them to be more robust in "RF challenged" environments with, for example, humidity and spray or with RF-dampening targets (e.g., including humans and cattle, which contain mostly water), reflective targets from metal (e.g., shipping containers, vehicles), or at longer distances. However, in contrast to passive RFID tags, active RFID tags are generally bigger (e.g., due to battery size) and more expensive to manufacture (e.g., due to price of the battery). However, the potential shelf life of active RFID tags is comparable to the shelf life of passive RFID tags, as self-discharge of batteries (of active RFID tags) competes with corrosion of aluminated printed circuits (of passive RFID tags).

Many active RFID tags today have operational ranges of hundreds of meters, and a battery life from several months to ten years. Active RFID tags may include larger memories than passive RFID tags, and may include the ability to store additional information received from the reader.

Internet Protocol Multimedia Subsystem/Session Initiation Protocol

IMS (IP (Internet Protocol) Multimedia Subsystem) is a next generation network architecture that allows wireless network carriers to both standardize and optimize Opex (Operational Expenditure) but also allows wireless network carriers to roll out next generation revenue generating services using a common IP backbone using Session Initiation Protocol (SIP) as the common signaling framework. Typical services leveraging IMS include, e.g., rich media centric services comprised of mixed media such as, for example, voice, video and other data.

SIP is a signaling protocol, widely used, for example, for setting up and tearing down multimedia communication sessions such as, e.g., voice and video calls over the Internet. Other feasible application examples include video conferencing, streaming multimedia distribution, instant messaging, presence information and online games. The protocol may be used for creating, modifying and terminating two-party (unicast) or multiparty (multicast) sessions consisting of one or several media streams. The modification can involve, for example, changing addresses or ports, inviting more participants, adding or deleting media streams, etc.

The SIP protocol may be situated at the session layer in the Open Systems Interconnection (OSI) model, and at the application layer in the transmission control protocol/internet protocol (TCP/IP) model. SIP is designed to be independent of the underlying transport layer. SIP may be run on, for example, TCP, user datagram protocol (UDP), or stream control transmission protocol (SCTP), amongst other protocols. Further, SIP is transport-independent, because SIP can be used with UDP, TCP, SCTP, etc., and is text-based, allowing for humans to read and analyze SIP messages.

SIP user agents (UAs) are the end-user devices, used to create and manage a SIP session. A SIP UA has two main components, the user agent client (UAC) and the user agent server (UAS). The UAC sends messages and answers with SIP responses. The UAS responds to SIP requests sent by the UAC.

While the present invention is described using SIP communications, the invention contemplates other communications protocols. Other communication protocols include, for example, TCP/IP, short message service (SMS), multimedia message service (MMS), or hypertext transfer protocol (HTTP), amongst other communication protocols.

As described above, the present invention is operable to receive RFID based information and combine it with knowledge of location and presence provided by the wireless network to control and manage power consumption in a home/office environment. As should be understood by those of ordinary skill in the art, location information may be used to define where an object, e.g., a person or a cellular telephone, is located. Location may be obtained by GPS, A-GPS, or triangulation methods known to those of skill in the art. Additionally, in computer and telecommunications networks, presence information is a status indicator that conveys ability and willingness of a potential communication partner, for example, a user, to communicate. A user's client may provide presence information (e.g., presence state) via a network connection to a presence service, which may be stored in what constitutes the user's personal availability record (called a presentity) and can be made available for distribution to other users (called watchers) to convey their availability for communication. Presence information has wide application in many communication services and is one of the innovations driving the popularity of instant messaging or recent implementations of voice over IP clients.

IMS allows for next generation foundational services such as presence and location to be exposed and consumed more efficiently. Specifically, mechanisms exist today to integrate location information into presence documents, which allows for location related changes to be transmitted to watchers via standard SIP (Session Initiation Protocol) based semantics.

By implementing the present invention, significant amounts of power may be saved, allowing for significant reductions in the global carbon footprint, while being plugged into the existing infrastructure both in the home and the wireless carrier network. Location geoboundaries can be used to drive master rules including control of appliances in the enclosure/environment (e.g., home, office, warehouse, retail space), resulting in significant power savings. Furthermore, concentric geoboundaries allow for actions to be initiated when subscribers, e.g., enter the outer geoboundary (for example, turn on a water heater).

Additionally, by implementing the present invention, RFID events triggered in the enclosure/environment can result in external SIP events that are sent to externally authorized watchers. Furthermore, implementing the present invention allows use of a local area network (LAN), e.g., a wireless LAN, to determine when a wireless device with a profile has left the range of the LAN.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a modular power control unit (MPCU) 30, which is operable to receive RFID based information and combine it with knowledge of location and presence provided by the wireless carrier network or other service provider to control and manage power consumption in a home and/or office environment, e.g., the processes described herein. The MPCU 30 can be implemented as one or more program code in the program control 44 stored in memory 22A as separate or combined modules.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard etc. Additionally, as shown in FIG. 1, the MPCU 30 is in communication with an external power grid 35, a home power grid 40, an RFID event junction 45, a home IP network 50 and the wireless carrier network (or other service provider) 240.

In general, the processor 20 executes computer program code (e.g., program control 44), which can be stored in the memory 22A and/or storage system 22B. Moreover, in accordance with aspects of the invention, the program control 44 having program code controls the MPCU 30. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Modular Power Control Unit

In accordance with aspects of the invention, the modular power control unit (MPCU) 30 is an RFID SIP gateway, which receives RFID based information and combines the RFID based information with knowledge of location and presence provided by the wireless carrier network to control and manage power consumption in, e.g., a home and/or office environment. In embodiments, the MPCU 30 may manage power consumption via: communications with a home/office power grid (e.g., a circuit breaker box); Power over Ethernet communications; and/or communications over a power line (e.g., X10 communications), amongst other communications.

Power over Ethernet (PoE) technology describes a system to transfer electrical power, along with data, to remote devices over standard twisted-pair cable in an Ethernet network. PoE may be useful for powering, for example, IP telephones, wireless LAN access points, network cameras, remote network switches, embedded computers, and other appliances. PoE is somewhat comparable to POTS (plain old telephone service) telephones, which also receive power and data (although analog) through the same cable.

As should be understood by those of ordinary skill in the art, there are several general terms used to describe PoE. For example, the terms Power over Ethernet (PoE), Power over LAN (PoL), and Inline Power are synonymous terms used to describe the powering of attached devices via Ethernet ports.

X10 is an international and open industry standard for communication among electronic devices used for home automation. X10 uses power line wiring for signaling and control, where the signals involve brief radio frequency bursts representing digital information. A wireless radio based protocol transport is also defined. More specifically, household electrical wiring, e.g., the same which powers lights and appliances, is used to send digital data between X10 devices. This digital data is encoded onto a 120 kHz carrier which is transmitted as bursts during the relatively quiet zero crossings of the 50 or 60 Hz AC alternating current waveform. One bit is transmitted at each zero crossing.

In embodiments, the digital data consists of an address and a command sent from a controller, e.g., the MPCU 30 to a controlled device, e.g., a particular power outlet. More advanced controllers can also query equally advanced devices to respond with their status. This status may be as simple as "off" or "on", or the current dimming level, or even the temperature or other sensor reading. Devices may plug into the wall where a lamp, television, or other household appliance plugs in; however, in embodiments, some built-in controllers may be used for, e.g., wall switches and ceiling fixtures.

Whether using power line or radio communications, packets transmitted using the X10 control protocol comprise a four bit house code followed by one or more four bit unit code, finally followed by a four bit command. For example, each controlled device is configured to respond to one of the two-hundred-fifty six possible addresses (sixteen house codes×sixteen unit codes). Each device reacts to commands specifically addressed to it, or possibly to several broadcast commands. For example, the protocol may transmit a message that says "select code A3", followed by "turn on", which commands unit "A3" to turn on its device. Several units can be addressed before giving the command, allowing a command to affect several units simultaneously. For example, "select A3", "select A15", "select A4", and finally, "turn on", causes units A3, A4, and A15 to all turn on.

Additionally, as should be understood by those skilled in the art, there is no restriction that prevents using more than one house code within a single house or office. The "all lights on" command and "all units off" commands will only affect a single house code, so an installation using multiple house codes effectively has the devices divided into separate zones.

In embodiments, the MPCU 30 has an integration point to an electrical subsystem in, e.g., a home, office or other enclosure, which distributes power to all of the outlets and appliances in the home/office. In embodiments, the integration point to an electrical subsystem may also provide for X10 communications to X10-enabled devices. Additionally, the MPCU 30 has an integration point to a wireless wide area network (WAN) of a wireless carrier network. In embodiments, the integration point to the WAN provides for presence and location services, e.g., using SIP communications, with specific usage of a mechanism by which location information is made part of the presence document for which the MPCU 30 is a presence watcher. In embodiments, the integration point to the wireless WAN may use an underlying transmission control protocol/internet protocol (TCP/IP) stack onboard the device, making the device a client of an existing dynamic host configuration protocol (DHCP) server inside the home and connected to the wireless carrier network using this connection as a SIP client. The MPCU 30 also has an integration point to a home IP network. In embodiments, the integration point to the home IP network provides for notifications of wireless LAN events. In embodiments, the integration point to a home IP network provides for PoE communications.

As described in further detail below, the MPCU 30, as a SIP end point, is registered as a user agent (UA) with the IMS network, via the existing IMS control plane and serving call session control function (S-CSCF). As should be understood by those of ordinary skill in the art, any initial filter criteria (IFC) that may be required, may be performed via an existing home subscriber server (HSS) in the IMS network. Additionally, as should be understood by those of ordinary skill in the art, IFC is the grouping between a Trigger Point (the logical expression matching a message) and an Application Server. The absence of a Trigger Point in an Initial Filter Criteria indicates that the message should be forwarded to the respective Application Server.

In accordance with aspects of the invention, the MPCU 30 additionally has an integration point to an accounting platform of the carrier network, for purposes of tracking activity to drive downstream accounting and mediation processes. Furthermore, the MPCU 30 has an integration point to a set of RFID scanners in the home/office that track movement within an established geoboundary (e.g., the home geoboundary). In accordance with aspects of the invention, this allows for granular controls, for example, at the zone level (e.g., multiple enclosures or rooms) or at the room level.

The MPCU 30 may be installed in homes/offices and configured so as to turn off power in multiple zones and rooms within the home/office based on, for example, the following types of use case scenarios. The following types of exemplary use case scenarios assume that three people are included in a home environment, all who have activated cellular devices, such as, for example, a cellular phone. Additionally, the exemplary use case scenarios assume that these cellular devices are SIP clients subscribing to location and presence services offered by the same wireless network carrier. There are wireless carrier provisioned devices, e.g., cellular devices, in the home/office enclosure that are on most of the time, and when they are off, no location and presence services are available. In addition, with this example, these cellular devices have, e.g., passive RFID tags attached to them.

Devices and other power consumers (such as, for example, a static light-bulb) may be registered with the MPCU 30 as being in specific zones of the home. Additionally, the registration of the devices and other power consumers with the MPCU 30 include specific rules associated with these devices/consumers/outlets. For example, a rule associated with a light bulb could, e.g., dim, turn off or turn on, when a specific event (e.g., a geoboundary event or an RFID event) occurs, as explained further below.

Subscribers associated with the home/office enclosure have RFID tags on their persons (e.g., associated with a personal item, such as, for example, a keychain or within a wallet). Additionally, the subscriber's devices and their associated chargers also have RFID tags associated with them (e.g., an active tag or a passive tag). The home/office enclosure is equipped with low power RFID scanners that feed events into the MPCU 30. In accordance with aspects of the invention, the MPCU 30 may then initiate specific power processing actions sent to the consumers in the enclosure. In embodiments, the RFID scanners may be connected via an existing CAT 5 grid (e.g., a network) in the enclosure to an RFID driver subcomponent of the MPCU 30.

Multiple approximately concentric geoboundaries (with a smaller geoboundary being, e.g., the target home/office) and/or progressively larger geoboundaries may be established with a carrier location platform. As should be understood by those of ordinary skill in the art, a geoboundary defines an area that may be entered or exited. Upon traversing the geoboundary, to enter or exit the defined area, a carrier location platform is operable to detect the traversal via a wireless device, e.g., a cellular telephone, in the wireless carrier network. In accordance with aspects of the invention, the geoboundaries and the carrier location platform may be used to generate notifications to the MPCU 30 upon crossing the geoboundaries bidirectionally. More specifically, the location platform is configured to provide a mechanism for generating geoboundaries and receiving location information of a user. In embodiments, the geoboundaries may be set at any distance or interval and at any location. The geoboundaries can thus be designated as any area based on coordinates that will be monitored for location enabled devices entering and exiting such boundaries. Additionally, in embodiments, the carrier location platform is capable of packaging location information of an RFID presence document via SIP (even though, in embodiments, this may not be necessary to practice the present invention).

In embodiments, the location information can be obtained from a global positioning system (GPS), A-GPS or triangulation methods implemented with a mobile device, e.g., a cellular telephone. GPS, A-GPS and triangulation methods can be implemented with a location platform provided by a service provider, for example, and implemented in a known manner such that further discussion is not required herein for a person of ordinary skill in the art to understand the invention.

In accordance with aspects of the invention, the following types of exemplary scenarios are feasible with the present invention. For example, a user has a charger plugged into a wall socket in their study at home, which is currently charging their MP3 player. Additionally, the user has registered with the MPCU 30 that the MP3 player is charged in the study. When the user unplugs the device from the charger and walks out of the study, the RFID scanner, e.g., at the periphery of the study senses the movement of the device and sends a signal to the MPCU 30. Accordingly, the MPCU 30 is aware that the outlet associated with the device charger is still drawing power (e.g., even though potentially at a much more reduced level) without charging the MP3 player. Thus, in accordance with aspects of the invention, the MPCU 30 proceeds to turn the power supply to the outlet completely off, shutting the power consumption of the MP3 charger to zero. In embodiments, an accounting record may be sent to the service provider accounting platforms.

Additionally, with a second example, a user's placement of a charger may be dynamic. That is, a user may charge their MP3 player in different rooms of a house, for example, depending on their location (e.g., not always in the study). Thus, in embodiments, both the charger and the MP3 player may include an RFID tag. With this scenario, when the RFID scanner senses that the MP3 player and the charger are not, e.g., in the same room or within a certain proximity of one another, the MPCU 30 may proceed to turn the outlet to which the charger is plugged in completely off, shutting the power consumption of the MP3 charger to zero.

With a third example, a husband, his wife and his daughter, who constitute (assuming that they carry their RFID tag enabled mobile devices with them when they exit the geoboundary) all the devices registered with the wireless carrier network for their domestic geoboundary (e.g., their home), leave their home. The wireless carrier network senses the successive geoboundary triggers (e.g., using GPS, triangulation, and/or geolocation, etc.) and sends an SIP notification to the MPCU 30. In response, the MPCU 30 proceeds to, for example, dim some light bulbs in the house, e.g., using X10, and turn off other light bulbs and completely shut off the water heater, e.g., via communications with the home power grid 40, based on the configuration settings (e.g., provided by the person). An accounting record is generated and sent to the service provider accounting platforms. For example, a user may be charged a fee for each turn-on/turn-off operation performed.

With a fourth example, the same three people in the house (e.g., husband, wife and daughter) move away from a zone (e.g., comprised of one or more rooms). The RFID scanners in the zone notify the MPCU 30, which then, for example, shuts off (or turns down) the heating, ventilation and air conditioning (HVAC) system for that zone and shuts off the lights for that zone, e.g., via X10 communications and/or communications with the home power grid 40. Additionally, accounting records, as appropriate, may be sent to the service provider accounting platforms.

With a fifth example, electrical components can be activated or turned on when a broader geoboundary is crossed. That is, for example, as a user is approaching their home and crosses one or more geoboundaries (detected by the location platform), the present invention may be used in a converse manner to the previously described example, to for example, turn on devices or appliances for, e.g., just-in-time usage. For example, a broader geoboundary trigger consisting of, e.g., a user's county may be used to send a SIP notification to the MPCU 30 upon crossing the geoboundary, which could then turn on specific appliances (such as, for example, an oven or water heater just in time) for use.

With a sixth example, an RFID triggered event may occur in the home/office (for example, a device is moved or turned off), which causes the MPCU 30 to generate a SIP notification to be sent to one of the subscribers (for example, a master subscriber, e.g., a head of household). For example, a child may be grounded by a parent and restricted to the home. However, the child may nonetheless leave the home in violation of their grounding. As the child has an RFID tag associated with them, for example, on a keychain, or in a wallet and/or on their personal devices (e.g., a cellular phone), upon leaving the range of the RFID scanners, the RFID scanners in the zone notify the MPCU 30. Additionally, upon crossing the zone geoboundary (e.g., the home), the location platform may notify the MPCU 30. Accordingly, the MPCU 30 may send a SIP notification to the master subscriber (e.g., the parent) indicating that the child (or the child's device) has crossed the home geoboundary. This may, for example, cause the subscriber (e.g., the parent) to drive home to, e.g., determine the whereabouts of their child.

Figure 2:
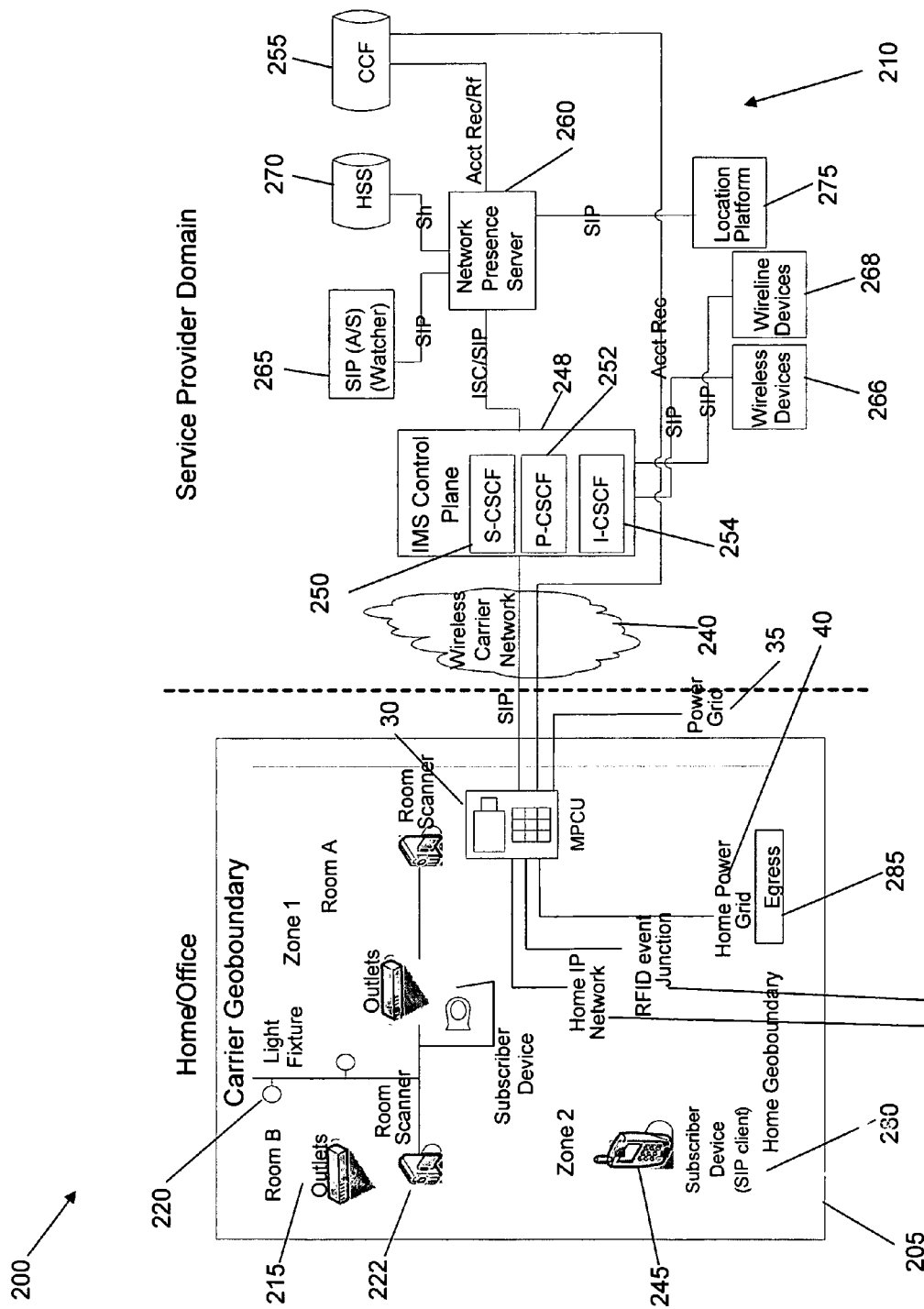
FIG. 2 shows an exemplary depiction of an overall architecture in accordance with aspects of the invention.

FIG. 2 shows an exemplary overall architecture 200 for implementing the present invention. As shown in FIG. 2, in embodiments, the MPCU 30 is located in the Home/Office 205 (on the left-hand side of FIG. 2). However, the invention contemplates that in further embodiments, the MPCU 30 may be located remotely (such as, for example, in the service provide domain 210 (on the right-hand side of FIG. 2) or in the electric utility domain (not shown)).

Multiple zones (e.g., zone one and zone two) are depicted in this home and/or office environment 205, with zone one containing two rooms (e.g., room A and room B) with power outlets 215, light fixtures 220 and RFID room scanners 222. The home (or office) environment 205 includes an egress 285 (e.g., a door). Further, the home environment 205 has an established home geoboundary 280 (which is registered with the location platform 275 of the IMS). In addition, as shown in FIG. 2, the MPCU 30 is connected to the external electrical power grid 35 and the home power grid 40. As should be understood by those of ordinary skill in the art, as the present invention may be implemented in a home and/or an office environment, depending on embodiments, the home power grid 40 may be an office power grid.

Additionally, the MPCU 30 is registered as an SIP User Agent with the wireless carrier network 240 and is registered as an IP addressable client with the home network 50. Traditional IMS clients, such as, for example, a wireless device 245, are also depicted in the home 205 and are also registered as SIP endpoints that feed into the presence infrastructure of the wireless service provider.

As shown in FIG. 2, the right-hand side depicts components of the IMS network of the service provider domain 210. The MPCU 30 connects into the wireless carrier network 240 using standard SIP semantics as a SIP user agent with the S-CSCF 250 of an IMS control plane 248 of the service provider domain 210. Several roles of SIP servers or proxies, collectively called Call Session Control Function (CSCF) shown within the IMS control plane 248, are used to process SIP signaling packets in the IMS.

The Serving-CSCF (S-CSCF) 250 is the central node of the signaling plane. The S-CSCF 250 is a SIP server, but performs session control too. As shown in FIG. 2, the S-CSCF 250 interfaces to the HSS 270 to download and upload user profiles. The S-CSCF 250 handles SIP registrations, which allows the S-CSCF 250 to bind the user location (e.g., the IP address of the terminal) and the SIP address. Additionally, the S-CSCF 250 sits on the path of all signaling messages, and can inspect every message. The S-CSCF 250 decides to which application server(s) the SIP message will be forwarded, in order to provide their services and enforces the policy of the network operator.

A Proxy-CSCF (P-CSCF) 252 is a SIP proxy that is the first point of contact for the IMS control plane 248. In embodiments, the terminal discovers its P-CSCF with either DHCP, or it is assigned in the PDP Context (in General Packet Radio Service (GPRS)).

An Interrogating-CSCF (I-CSCF) 254 is another SIP function located within the service provider domain 210. The I-CSCF IP address is published in the Domain Name System (DNS) of the domain, so that remote servers can find it, and use it as a forwarding point (e.g., registering) for SIP packets to this domain.

As should be understood by those skilled in the art, aspects of the service provider domain 210, e.g., the IMS control plane 248, S-CSCF 250, P-CSCF 252 and I-CSCF 254, as well as SIP communications are known to those skilled in the art. As such, a further description of these aspects are not deemed necessary for an understanding of the present invention.

As additionally shown in FIG. 2, the right-hand side depicts other components of the IMS network. They include other application servers, e.g., wireless devices 266 and/or wireline devices 268, a network presence server 260, a location platform 275, other SIP application server watchers 265 (who may be, for example, interested in presence status changes across the wireless carrier network 240, a charging collector function (CCF) 255 and a home subscriber server (HSS) 270.

The network presence server 260 accepts, stores and distributes presence information. As described above, presence (e.g., presence state) constitutes the user's personal availability. The network presence server 260 may be implemented as a single server or have an internal structure involving multiple servers and proxies. There may be complex patterns of redirection and proxying while retaining logical connectivity to a single presence service.

The location platform 275 is also shown as being connected to the network presence server 260 primarily to depict that, in embodiments, location information may be incorporated into the presence document. However, as should be understood by those of ordinary skill in the art, incorporating location information into the presence document may not be necessary, as other mechanisms of exposing and consuming location information are readily available and supported.

FIG. 2 also depicts the capability of the MPCU 30 generating accounting records to an IMS charging collector function (CCF) 255. In embodiments, all the SIP network entities (e.g., the P-CSCF 252, the I-CSCF 254, the S-CSCF 250) involved in the session send accounting information to the CCF 225 located in the service provider domain 210. The CCF 225 is operable to collect this information, and build a billing record, which is sent to a billing system (not shown).

The HSS 270 comprises a master user database that supports the IMS network entities. The HSS 270 contains the subscription-related information (e.g., user profiles), and is operable to perform authentication and authorization of the user, and can provide information about the user's physical location.

Figure 3:
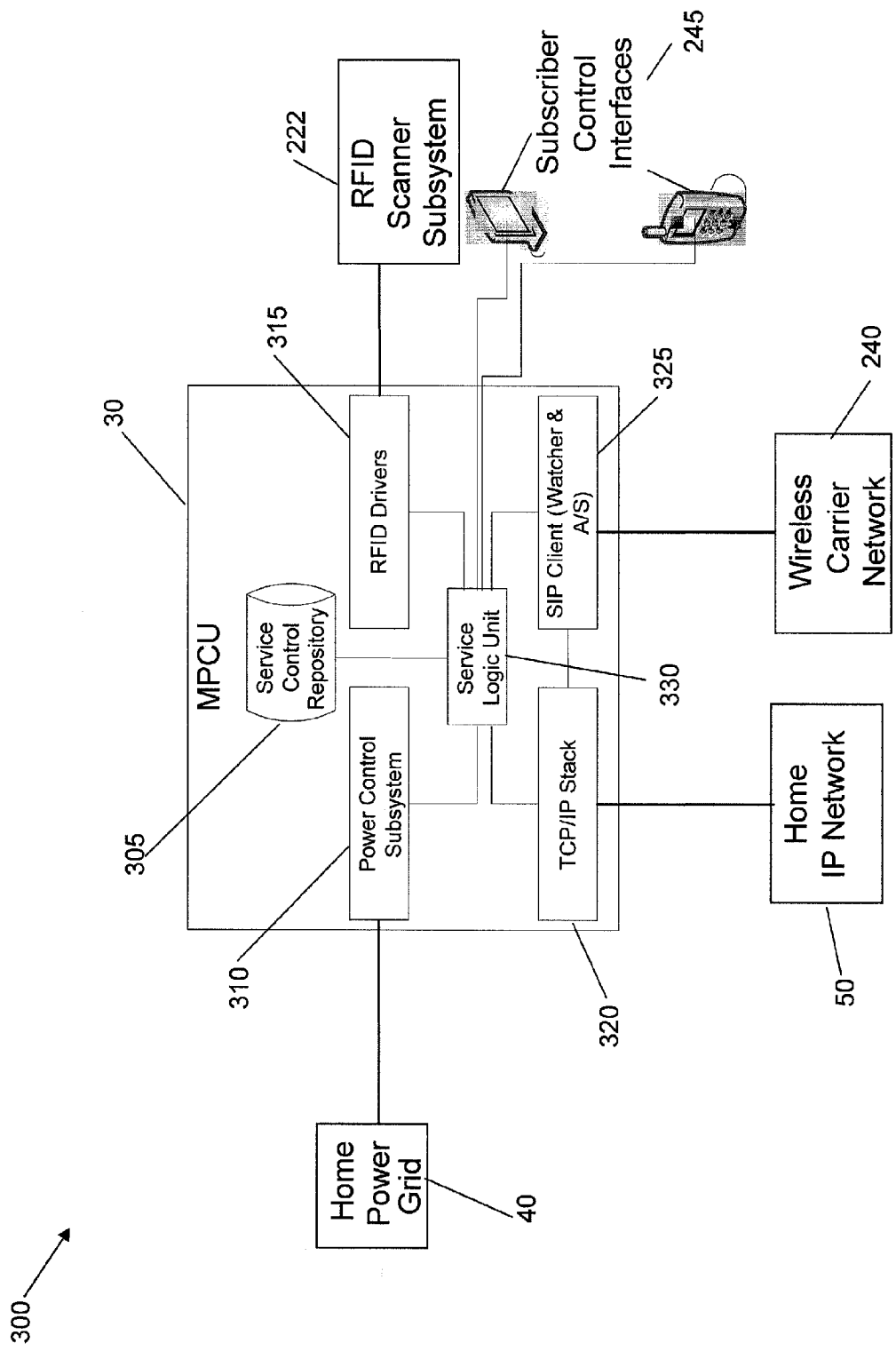
FIG. 3 shows an exemplary depiction of the components of a modular power control unit (MPCU) in accordance with aspects of the invention.

FIG. 3 shows an exemplary depiction 300 of the components of the MPCU 30. In embodiments, the MPCU 30 includes a service control repository 305, a power control subsystem 310, RFID drivers 315, a TCP/IP stack 320, an SIP client 325, and a service logic unit 330.

The service control repository 305 contains service configuration data. More specifically, in embodiments, the service control repository 305 may contain designations of a number of zones associated with the home/office, and the number or rooms associated with each zone. In embodiments, a zone may have at minimum one room, and typically has more than one room associated therewith. Additionally, the service control repository 305 may contain a listing of, e.g., devices, outlets, and appliances (referred to as consumers) associated with the zones and a listing of consumers associated with each room in each zone. Furthermore, the service control repository 305 may contain RFID tag identifications associated with, e.g., persons, wireless devices and chargers, and states associated with each consumer. In embodiments, the server configuration data may be provided by a user (e.g., a home owner or an office manager) and/or a service provider.

In addition to, or alternatively to, having purely binary states associated with each consumer (e.g., off or on), there can also be other settings, such as, for example, dim by twenty percent or increase by ten percent associated with specific consumers, which, in embodiments, may be implemented using, e.g., communications with the home power grid 40 or X10 communications with specific X10-enabled consumers (e.g., devices) via the connection to the home power grid 40. Furthermore, the service control repository 305 may include configurable time periods after each event, before an action is invoked. For example, the service control repository 305 may include instructions to wait, e.g., five minutes after the subscriber leaves the house before turning off a heating, ventilation and air conditioning (HVAC) system.

Additionally, the service control repository 305 may contain rules associated with SIP notifications received from the wireless carrier network 240. For example, one rule could be a specific notification from the wireless carrier network 240 indicating that all subscribers have left the home/building 205, triggering a specific rule sequence that, for example, causes changes to HVAC consumers and causes multiple light bulb consumers to be turned off. In embodiments, the service control repository 305 may be stored in the storage system 22B of FIG. 1.

In accordance with further aspects of the invention, the power control subsystem 310 is the interface to the home (or office) power grid 40. Instructions for each consumer may be sent out by the service logic unit (SLU) 330 to the power control subsystem 310 when notifications from the RFID drivers 315 or the SIP interface are received and processed by the SLU 330, described further below.

Additionally, as shown in FIG. 3, the MPCU 30 includes RFID drivers 315. The RFID drivers 315 allow the MPCU 30 to process RFID events received from the RFID scanner subsystem comprising the RFID scanners 222 in the target enclosure (e.g., the home or office environment). Upon the occurrence of RFID events, the RFID drivers 315 send notifications of these events to the SLU 330 for processing.

In accordance with further aspects of the invention, the TCP/IP stack 320 allows the MPCU 30 to be a node in the home (or office) IP network 50. That is, via an existing gateway, the MPCU 30 uses the existing internet connection of the home IP network 50 to be an SIP client of the wireless carrier network 240, and also allows for configuration via an external client (e.g., a mobile device browser or a regular browser). Additionally, the TCP/IP stack 320 provides for PoE controls over devices, as described above, to manage power consumption.

Also, the MPCU 30 includes the SIP client 325, which may be a watcher and/or an application server. The SIP client 325 allows the MPCU 30 to utilize the existing TCP/IP stack 320 to be a special SIP UA of the wireless carrier network 240 for purposes of, e.g., receiving notifications from the wireless carrier network 240 (such as, for example, a geoboundary trigger) or, e.g., providing notifications to the wireless carrier network 240 when an RFID event occurs.

Additionally, as shown in FIG. 3, the MPCU 30 includes the service logic unit (SLU) 330. The SLU 330 comprises the processing engine of the MPCU 30. The SLU 330 receives indications of events from the RFID drivers 315 and the SIP client 325 and then uses the data in the service control repository 305 to determine how to react to these events. Typical actions may include, for example, changes sent to the home (or office) power grid 40 or notifications sent to the wireless carrier network 240 (e.g., the presence server 260) via the S-CSCF 250.

In embodiments, the MPCU 30 can be implemented as an embedded low cost Linux®-based client that has all the above elements pre-packaged into the MPCU 30. (Linux is a registered trademark of Linus Torvalds in the United States, other countries, or both.)

Flow Diagrams

Figure 4:
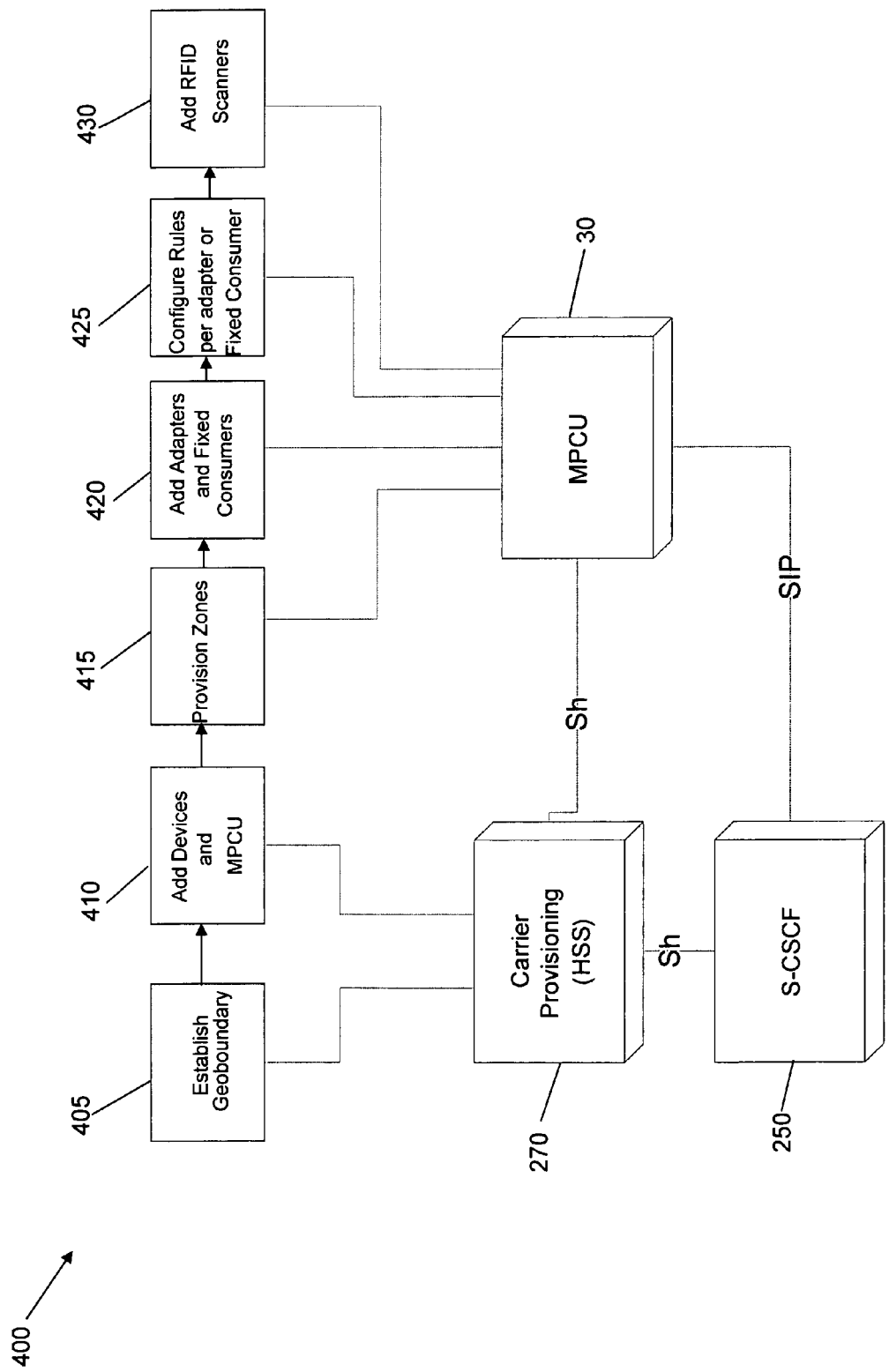
FIG. 4 shows an exemplary flow for a power management provisioning in accordance with aspects of the invention.
Figure 5:
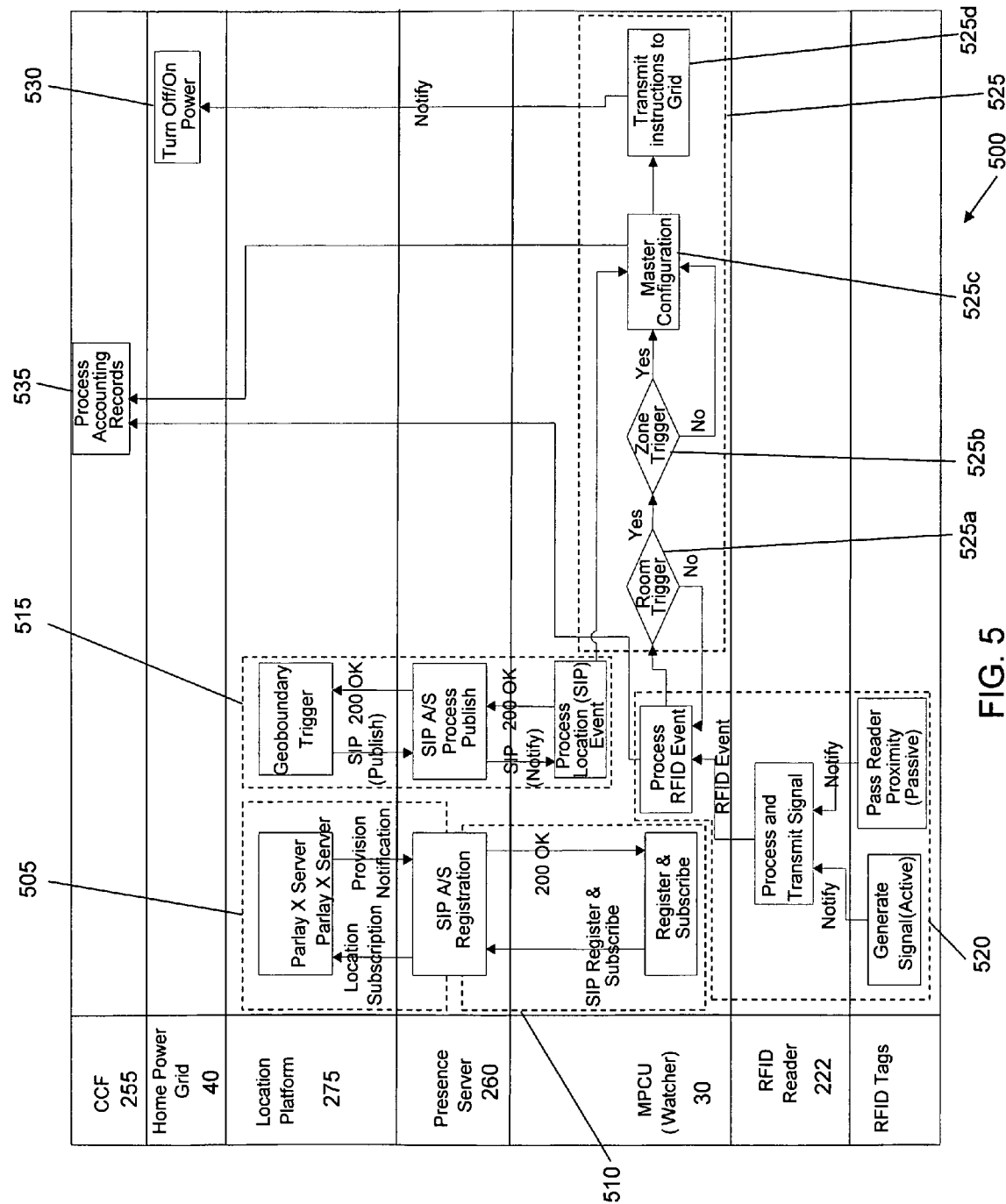
FIGS. 5 and 6 show exemplary swim lane diagrams depicting runtime call flows in accordance with aspects of the present invention.
Figure 6:
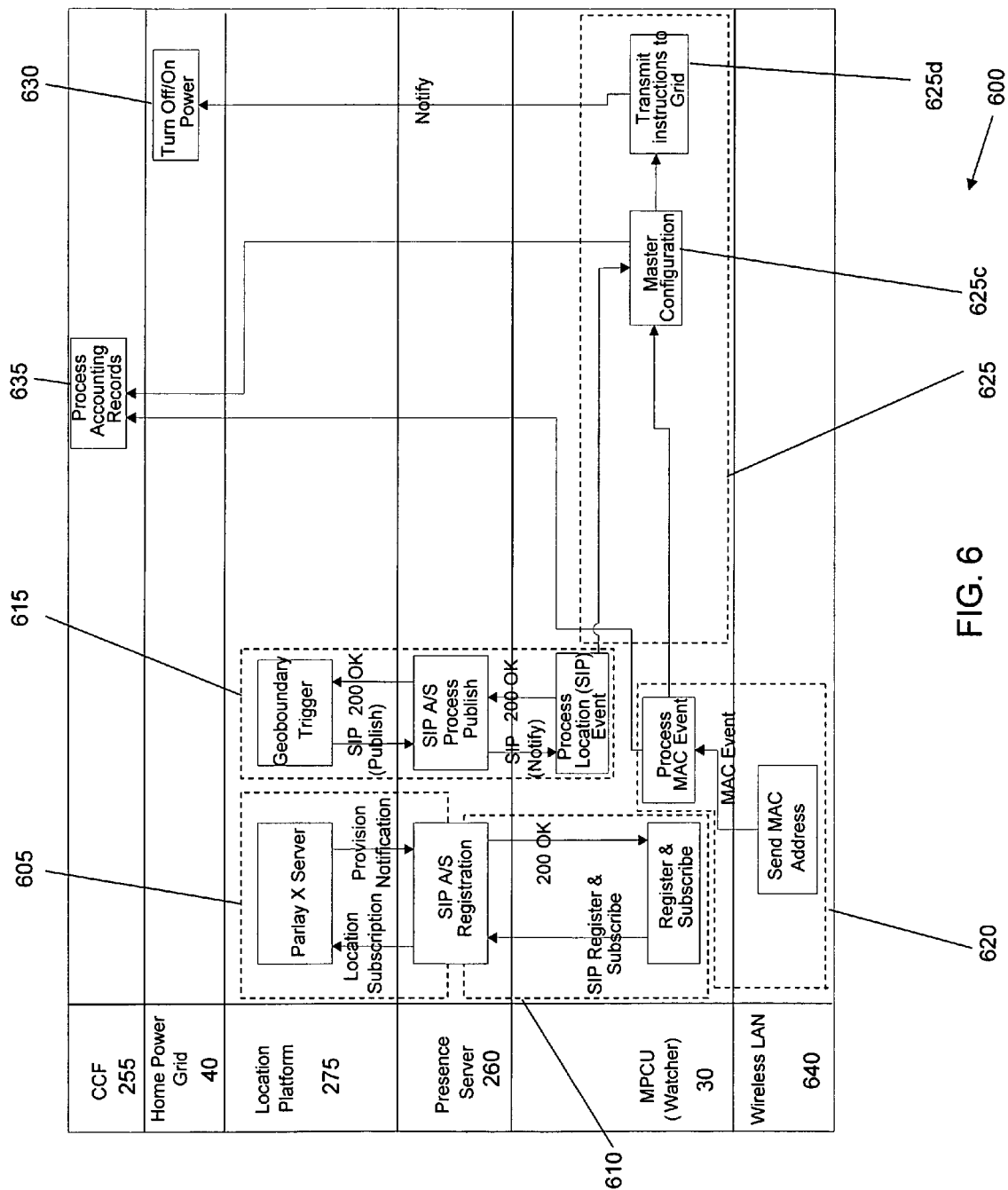

FIGS. 4-6 show exemplary flows for performing aspects of the present invention. The steps of FIGS. 4-6 may be implemented in the environment of FIG. 1, for example. The flow diagrams may equally represent high-level block diagrams or swim-lane diagrams of the invention. The flowcharts and/or block diagram in FIGS. 4-6 illustrate the architecture, functionality, and operation of possible implementations of systems, methods and computer program products according to various embodiments of the present invention. In this regard, each block in the flowcharts, block diagrams or swim-lane diagrams may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 4 depicts an exemplary flow 400 for a provisioning process in accordance with aspects of the present invention. Additionally, FIG. 4, shows the HSS 270, the MPCU 30 and the S-CSCF 250 and indicates the communications, e.g., between a user and the HSS 270, the MPCU 30 and the S-CSCF 250 during the provisioning process 400.

As shown in FIG. 4, at step 405, a user (e.g., a home owner, office manager and/or service provider) communicating with the HSS, configures or establishes the geoboundaries with the service provider wireless carrier network, associated with a subscriber device. Any initial filter criteria (IFC) that may be required is carried out as part of the actual SIP registration call flow when a registrar is used for user agent registration.

At step 410, a user, communicating with the HSS, registers or adds devices (e.g., cellular telephones) and the MPCU 30 itself as legitimate user agents (UAs) to the wireless network. Step 410 results in specific provisioning for the UAs in the IMS network. At step 415, the user provisions the MPCU 30 with, for example, the zone and room information associated with an enclosure/environment, e.g., a home or office. At step 420, a user identifies in the MPCU 30 all the consumers (e.g., lights, outlets, chargers, etc.) associated with a zone and/or the rooms associated with a zone. At step 425, a user programs specific event/action sequences in the MPCU 30 associated with each consumer. For example, a water heater in zone C (e.g., the garage) may have an instruction which instructs the MPCU 30 to shut off the water heater when the MPCU 30 receives an SIP notification from the IMS control plane 250 instructing the MPCU 30 that all the subscribers have left the geoboundary and ten minutes have elapsed. At step 430, the user associates the RFID scanners with each zone and room in the MPCU 30, such that specific event sequences can be associated with each zone and room.

Additionally, as shown in FIG. 4, the S-CSCF 250 communicates with the MPCU 30 with SIP notifications and the HSS 270 communicates with both the S-CSCF 250 and the MPCU 30 using Sh. As should be understood by those of ordinary skill in the art, Sh is an interface type in IMS connected to the HSS 270.

FIG. 5 shows an exemplary swim lane diagram 500 depicting a runtime call flow in accordance with aspects of the present invention. More specifically, the exemplary swim lane diagram 500 depicts a power management operation of the MPCU 30 in response to a geoboundary trigger and/or an RFID trigger. The swim lane diagram of FIG. 5 shows the following roles: the CCF 255, the home power grid 40, the location platform 275, the presence server 260, the MPCU 30, the RFID reader 222 and RFID tags.

At step 505, the presence server 260 registers the location platform 275 as a presence source. More specifically, the presence server 260 registers specific geoboundary notifications with the location platform 275 on behalf of specific subscribers. In addition, the presence server 260 registers all the application servers as UAs with the IMS core platform.

At step 510, the MPCU 30 also registers with the presence server 260 of the IMS infrastructure and, subsequently, subscribes with the presence server 260 as a watcher for specific SIP events that are of interest to the MPCU 30. As should be understood by those of ordinary skill in the art, "200 OK" is a standard SIP acknowledgment communication, which may be thought of as a return receipt.

At step 515, the location platform 275 detects a geoboundary trigger when a geoboundary event occurs and publications go out to the SIP application server (A/S) of the presence server 260. Moreover, the SIP A/S of the presence server 260 sends specific SIP notifications to the MPCU 30 indicating the geoboundary event.

At step 520, the RFID drivers 315 within the MPCU 30 detect an RFID event. As shown in FIG. 5, if the RFID tag is an active RFID tag, the RFID tag will generate a signal to notify the RFID reader 222. If the RFID tag is a passive RFID tag, the RFID tag will be read by the RFID reader 222.

At step 525, the MPCU 30 transmits instructions to the home power grid 40 to manage power consumption based on a geoboundary event and/or an RFID event. For a geoboundary event, the process flows directly to a master configuration sub-step 525c, where the MPCU 30 accesses the service control repository of the MPCU 30 to determine the power control actions associated with the geoboundary trigger. At sub-step 525d, the power control subsystem of the MPCU 30 transmits instructions to the home power grid 40 to effect the power control actions.

For an RFID event, at step 525, the MPCU 30 initially determines whether the RFID event causes a room trigger and/or a zone trigger. More specifically, at sub-step 525a, the MPCU 30 determines whether the RFID event causes a room trigger (e.g., triggering an event for the room, for example, turning off an outlet in the room). If, at sub-step 525a, the MPCU 30 determines that the RFID event causes a room trigger, at sub-step 525b, the MPCU 30 determines whether the RFID event also causes a zone trigger (e.g., triggering an event for the zone, for example, turning off outlets in the entire zone). That is, as a zone is inclusive of a room, if an RFID event does not constitute a room trigger, than that RFID event cannot constitute a zone trigger. If the MPCU 30 determines that the RFID event does not constitute a room trigger, then the process reverts to step 520.

However, if the MPCU 30 determines that the RFID event does constitute a room trigger, at sub-step 525b, the MPCU 30 additionally determines whether the RFID event constitutes a zone trigger. If, at sub-steps 525a or 525b, the MPCU 30 determines the RFID event causes a room trigger or a room trigger and a zone trigger, at sub-step 525c, the MPCU accesses the service control repository of the MPCU 30 to determine the power control actions associated with the RFID trigger. At sub-step 525d, the MPCU 30 transmits instructions from the power control subsystem to the home power grid 40 to effect the power control actions.

At step 530, the home power grid 40 effects the power control actions (e.g., turns on/off power). At step 535, the CCF 255 (accounting platform) receives accounting records of specific events, e.g., a power turn off operation, from the MPCU 30. This allows downstream mediation and billing actions to be driven, which allows for flexible business model support.

FIG. 6 shows an exemplary swim lane diagram 600 depicting an alternative runtime call flow in accordance with aspects of the present invention. The swim lane diagram of FIG. 6 shows the following roles: the CCF 255, the home power grid 40, the location platform 275, the presence server 260, the MPCU 30, a wireless LAN 640. In contrast to FIG. 5, where the MPCU 30 utilizes a geoboundary event and/or an RFID event to manage power consumption, with the example of FIG. 6, the MPCU utilizes a geoboundary event and/or a wireless event, for example, a wireless device entering or a wireless device leaving wireless range of the wireless local area network (LAN) 640, to manage power consumption. While shown in two separate exemplary swim lane diagrams, it should be understood that the invention contemplates that the MPCU 30 may utilize any of a geoboundary event, an RFID event and/or a wireless event to manage power consumption.

At step 605, the presence server 260 registers the location platform 275 as a presence source. More specifically, the presence server 260 registers specific geoboundary notifications with the location platform 275 on behalf of specific subscribers. In addition, the presence server 260 registers all the application servers as UAs with the IMS core platform.

At step 610, the MPCU 30 also registers with the presence server 260 of the IMS infrastructure and, subsequently, subscribes with the presence server 260 as a watcher for specific SIP events that are of interest to the MPCU 30.

At step 615, the location platform 275 detects a geoboundary trigger when a geoboundary event occurs and publications go out to the SIP application server (A/S) of the presence server 260. Moreover, the SIP A/S of the presence server 260 sends specific SIP notifications to the MPCU 30 indicating the geoboundary event.

At step 620, the wireless local area network (LAN) 640 detects a wireless event, for example, a wireless device entering or a wireless device leaving wireless range of the LAN 640 and an indication of the wireless event is sent to the MPCU 30. In embodiments, the detection of the wireless event may be determined using media access control (MAC) addresses. In computer networking, a MAC address is a quasi-unique identifier assigned to most network adapters or network interface cards (NICs) by the manufacturer for identification.

At step 625, the MPCU 30 transmits instructions to the home power grid 40 to manage power consumption based on a geoboundary event and/or a wireless event. For a geoboundary event, the process flows directly to a master configuration sub-step 625c, where the MPCU 30 accesses the service control repository of the MPCU 30 to determine the power control actions associated with the geoboundary trigger. At sub-step 625d, the power control subsystem of the MPCU 30 transmits instructions to the home power grid 40 to effect the power control actions. For a wireless event, at sub-step 625c, the MPCU 30 accesses the service control repository of the MPCU 30 to determine the power control actions associated with the wireless trigger. At sub-step 625d, the MPCU power control subsystem transmits instructions to the home power grid to effect the power control actions.

At step 630, the home power grid 40 effects the power control actions (e.g., turns on/off power). At step 635, the CCF 255 (accounting platform) receives accounting records of specific events, e.g., a power turn off operation, from the MPCU 30. This allows downstream mediation and billing actions to be driven, which allows for flexible business model support.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method comprising computer implemented steps of:
    detecting an occurrence of a geoboundary event;
    detecting an occurrence of a radio frequency identification (RFID) event;
    determining a first power control action associated with the geoboundary event;
    determining a second power control action associated with the RFID event, the second power control action being different than the first power control action; and
    accessing an environment power grid to adjust power supply in an environment and adjusting one or more power consumption settings of the environment to effect the first power control action based on the occurrence of the geoboundary event and to effect the second power control action based on the occurrence of the RFID event.

2. The method of claim 1, wherein the detecting the occurrence of the geoboundary event comprises:
    receiving location information of a device from a wireless carrier network; and
    determining that the location information indicates a traversal of the device across an established geoboundary.

3. The method of claim 2, wherein the determining the location information of the device via the wireless carrier network comprises using a IP multimedia subsystem (IMS).

4. The method of claim 1, wherein the occurrence of the geoboundary event is sent using session initiation protocol (SIP).

5. The method of claim 1, wherein the detecting the occurrence of the RFID event comprises at least one of:
    detecting an arrival of an RFID tag within at least one of a room and a zone of the environment;
    detecting a departure of the RFID tag from the at least one of the room and the zone of the environment;
    detecting a presence of two or more RFID tags within a predetermined range of one another; and
    detecting an absence of the two or more RFID tags within the predetermined range of one another.

6. The method of claim 1, further comprising determining an occurrence of a local area network (LAN) event, wherein the detecting the occurrence of the LAN event comprises detecting at least one of:
    an arrival of a LAN-enabled device within a range of a LAN; and
    a departure of the LAN-enabled device from the range of the LAN.

7. The method of claim 1, wherein the adjusting the one or more power consumption settings further comprises controlling power distribution in the environment by at least one of:
    accessing the environment power grid to effect power line wiring signaling and/or control; and
    accessing an environment interne protocol (IP) network to effect Power-over-Ethernet signaling and/or control.

8. The method of claim 1, wherein the environment comprises one or more zones and wherein the one or more zones each comprise one or more rooms.

9. The method of claim 1, wherein the environment is one of an office environment, a home environment, a retail environment and a warehouse environment.

10. The method of claim 1, further comprising provisioning at least one of:
    one or more geoboundaries;
    one or more RFID zones; and
    one or more RFID rooms in each of the one or more RFID zones.

11. The method of claim 10, wherein the one or more geoboundaries comprises an environment geoboundary defined by a perimeter of the environment.

12. The method of claim 10, wherein the one or more geoboundaries comprise at least one of concentric and progressively larger geoboundaries surrounding the environment.

13. The method of claim 1, further comprising providing an RFID tag for at least one power consuming device.

14. The method of claim 13, further comprising establishing one or more power consumption rules for the at least one power consuming device, wherein the adjusting the one or more power consumption settings is performed in accordance with the one or more power consumption rules for the at least one power consuming device.

15. The method of claim 1, further comprising provisioning a wireless device as a SIP client of the wireless carrier network.

16. The method of claim 4, wherein a service provider at least one of creates, maintains, deploys and supports the computer infrastructure.

17. The method of claim 1, wherein the steps are provided by a service provider on a subscription, advertising, and/or fee basis.

18. A system, comprising:
    an IP multimedia subsystem (IMS) operable to:
        detect an occurrence of a geoboundary event; and
        send an indication of occurrence of the geoboundary event using session internet protocol (SIP); and
    a control unit operable to:
        receive the indication of the geoboundary event;
        determine an occurrence of a radio frequency identification (RFID) event; and access an environment power grid to adjust power supply in an environment and adjust one or more power consumption settings of the environment based on the indication of the geoboundary event and the determining the occurrence of the RFID event.

19. The system of claim 18, wherein the control unit is a SIP client of the IMS.

20. The system of claim 18, further comprising one or more wireless devices registered as a SIP client of the IMS.

21. The system of claim 18, further comprising at least one RFID scanner operable to determine the occurrence of the RFID event.

22. The system of claim 18, wherein the control unit is further operable to adjust the one or more power consumption settings of the environment via at least one of:
  a connection to the environment power grid to effect power line wiring signaling and/or control; and
  a connection to an environment internet protocol (IP) network to effect Power-over-Ethernet signaling and/or control.

23. The system of claim 18, wherein the IP multimedia subsystem (IMS) comprises:
  an IMS control plane;
  a network presence server operable to detect presence of a user and communicate via SIP;
  a location platform operable to detect location information of the user via a wireless device of the user, which is registered as a SIP client, and communicate the location information to the network presence server;
  one or more SIP watcher application servers in communication with the network presence server operable to detect the geoboundary event;
  a charging collector function (CCF) operable to collect information for billing; and
  a home subscriber server (HSS) operable to perform at least one of authentication and authorization of the user.

24. A computer program product comprising a computer usable storage memory having readable program code embodied in the storage memory, the computer program product includes at least one component operable to:
  detect an occurrence of:
    a geoboundary event;
    a radio frequency identification (RFID) event; and
    a local area network (LAN) event; and
  determine a first power control action associated with the geoboundary event;
  determine a second power control action associated with the RFID event;
  determine a third power control action associated with the LAN event, the first power control action, the second power control action, and the third power control action being different from one another;
  access an environment power grid to adjust power supply in an environment and adjust one or more power consumption settings of the environment to effect the first power control action based on the occurrence of the geoboundary event, to effect the second power action based on the occurrence of the RFID event, and to effect the third power control action based on the occurrence of the LAN event,
  wherein the detecting the occurrence of the geoboundary event comprises:
    receiving location information of a device from a wireless carrier network; and
    determining that the location information indicates a traversal of the device across an established geoboundary, and
  wherein an indication of the occurrence of the geoboundary event is transmitted via session internet protocol (SIP).

25. A method comprising computer implemented steps of:
detecting an occurrence of:
  a geoboundary event in response to a determination that a wireless device in a wireless carrier network has traversed an established geoboundary;
  a radio frequency identification (RFID) event; and
  a local area network (LAN) event;
determining whether the geoboundary event is a geoboundary trigger for a first event or series of actions including control of a power grid or an environment internet protocol (IP) network of an environment;
determining whether the RFID event is an RFID trigger for a second event or series of actions including the control of the power grid or the environment IP network of the environment;
determining whether the LAN event is a LAN trigger for a third event or series of actions including the control of the power grid or the environment IP network of the environment;
receiving one or more power consumption rules for at least one power consuming device in the environment, wherein the one or more power consumption rules instruct the first event or series of actions, the second event or series of actions, and the third event or series of actions to be taken when the geoboundary trigger, the RFID trigger, or the LAN trigger are respectively determined; and
accessing the power grid or the environment IP network of the environment using a processor and adjusting one or more power consumption settings of the environment based on whether the geoboundary event is the geoboundary trigger, the RFID event is the RFID trigger, or the LAN event is the LAN trigger,
wherein the adjusting the one or more power consumption settings of the environment:
  is performed in accordance with the one or more power consumption rules for the at least one power consuming device; and
  comprises controlling power distribution in the environment by at least one of:
    accessing the power grid to adjust power supply in the environment;
    accessing the power grid to effect power line wiring signaling and/or control; and
    accessing the environment IP network to effect Power-over-Ethernet signaling and/or control, and
wherein an indication of the occurrence of the geoboundary event is transmitted using session initiation protocol (SIP).

26. The method of claim 25, further comprising:
providing service configuration data comprising:
  designations of one or more zones of the environment;
  designations of one or more rooms for each of the one or more zones;
  a listing of consumers associated with each of the one or more rooms;
  one or more RFID tag identifications indicating an association to a consumer or a person; and
  power control rules associated with each consumer or person for adjusting the one or more power consumption settings of the environment.

27. The method of claim 26, further comprising:
providing the at least one power consuming device with an RFID tag;

providing a personal item or a mobile device of the consumer or the person with an RFID tag associated with the one or more RFID tag identifications; and providing the environment with an RFID scanner configured to scan for the at least one power consuming device with the RFID tag and the personal item or the mobile device of the consumer or the person with the RFID tag.

28. The method of claim 27, wherein the detecting the occurrence of the RFID event comprises:

detecting an arrival of the personal item or the mobile device of the consumer or the person with the RFID tag within the one or more rooms of the environment;

detecting a departure of the personal item or the mobile device of the consumer or the person with the RFID tag from the one or more rooms of the environment;

detecting a presence of the at least one power consuming device with the RFID tag within a predetermined range of the personal item or the mobile device of the consumer or the person with the RFID tag; and detecting an absence of the at least one power consuming device with the RFID tag within the predetermined range of the personal item or the mobile device of the consumer or the person with the RFID tag.

* * * * *